US012561912B2

(12) United States Patent
Lee et al.

(10) Patent No.: US 12,561,912 B2
(45) Date of Patent: Feb. 24, 2026

(54) HIGHLIGHTING 3D MODEL MESHES AND SUB-MESHES WITH POST PROCESSING

(71) Applicant: Walmart Apollo, LLC, Bentonville, AR (US)

(72) Inventors: Daniel Hyunwoo Lee, Whittier, CA (US); Sreeneel Maddika, San Ramon, CA (US); Vijay Saradhi Yellapragada, San Ramon, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 299 days.

(21) Appl. No.: 18/386,538

(22) Filed: Nov. 2, 2023

(65) Prior Publication Data

US 2025/0148711 A1 May 8, 2025

(51) Int. Cl.
G06T 1/20 (2006.01)
G06T 7/20 (2017.01)
G06T 17/20 (2006.01)
G06V 10/54 (2022.01)

(52) U.S. Cl.
CPC ............... G06T 17/20 (2013.01); G06T 1/20 (2013.01); G06V 10/54 (2022.01)

(58) Field of Classification Search
CPC ......... G06V 10/54; G06T 1/20; G06T 11/001; G06T 15/04; G06T 17/00; G06T 17/05; G06T 17/20; G06T 19/00; G06T 19/006

USPC .................................................. 345/506, 582
See application file for complete search history.

(56) References Cited

U.S. PATENT DOCUMENTS

| | | | |
|---|---|---|---|
| 7,277,572 B2 | 10/2007 | Macinnes et al. | |
| 10,210,618 B1 * | 2/2019 | Kuffner .................... | G06T 7/11 |
| 2016/0171765 A1 | 6/2016 | Mehr | |
| 2019/0304161 A1 | 10/2019 | Yin et al. | |
| 2023/0083607 A1 | 3/2023 | Sarshar et al. | |
| 2025/0069318 A1 * | 2/2025 | Maschmeyer ............ | G06T 7/11 |

OTHER PUBLICATIONS 5 ways to draw an outline—Unity, GitHub Aug. 2021.

* cited by examiner

*Primary Examiner* — Jacinta M Crawford
(74) *Attorney, Agent, or Firm* — DICKINSON WRIGHT RLLP; Hector A. Agdeppa

(57) ABSTRACT

A system including one or more processors and one or more non-transitory computer-readable media storing computing instructions, that when executed on the one or more processors, cause the one or more processors to perform operations including: obtaining triangle data of a 3D model of an item; generating a first mask texture of the 3D model based on the triangle data; generating a second mask texture of the 3D model larger than the first mask texture by extruding the triangle data; and rendering a 3D outline mesh onto an image of the 3D model to highlight the 3D model, such that the 3D outline mesh subtracts the first mask texture for the second mask texture. Other embodiments are disclosed.

20 Claims, 10 Drawing Sheets

400

405 – Obtaining triangle data of a 3D model

410 – Generating a first mask texture of the 3D model

415 – Generating a second mask texture of the 3D model

420 - Rendering a 3D outline mesh onto an image of the 3D model

425 – Enabling post-processing by writing to a camera buffer memory

430 – Calling a camera frame from the camera buffer memory

Figure 5:
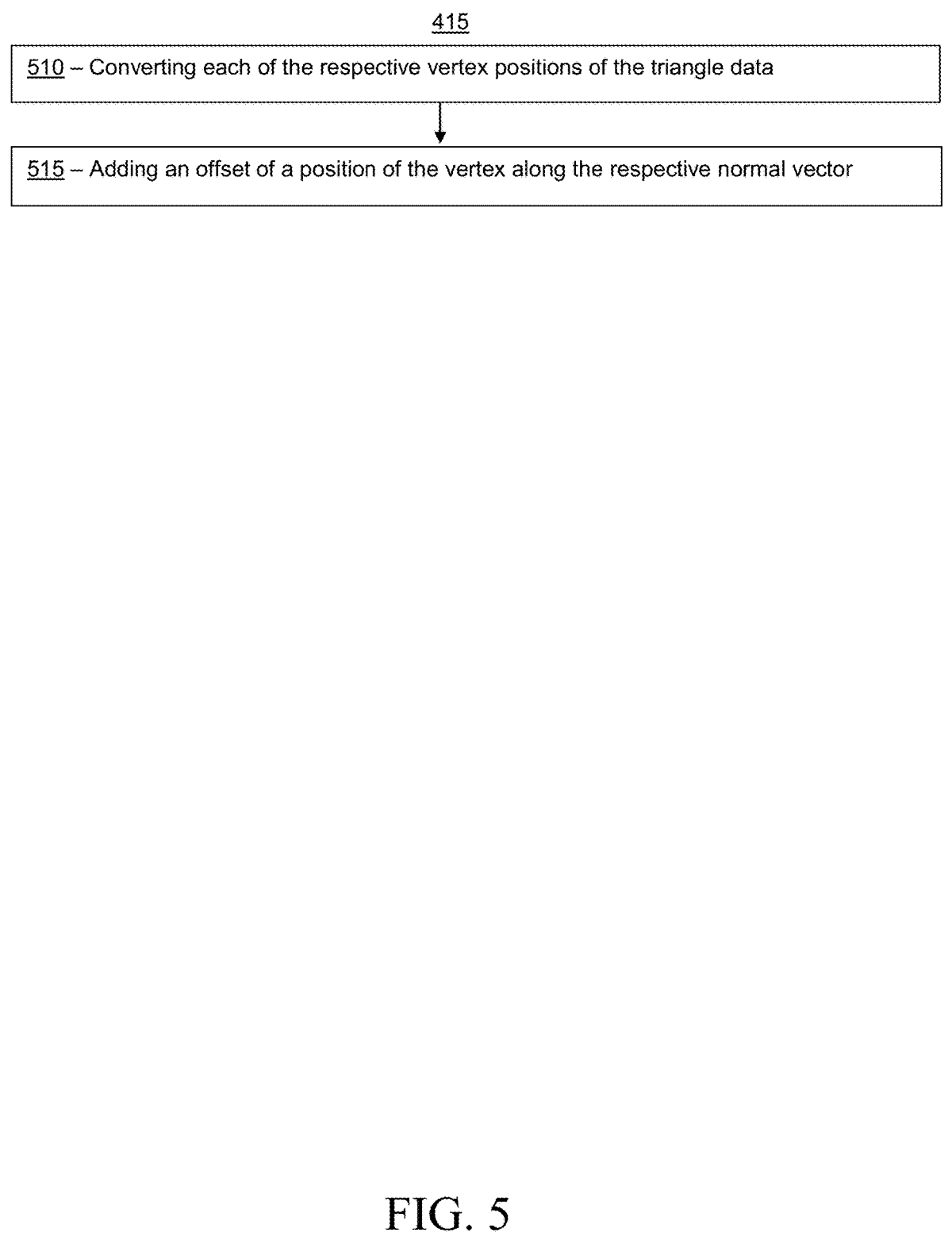

415

510 – Converting each of the respective vertex positions of the triangle data

515 – Adding an offset of a position of the vertex along the respective normal vector

610 – Processing the camera scene of a camera frame buffer

615 – Render the 3D outline mesh

620 – Render one or more 3D outline sub-meshes of the 3D outline mesh

625 - Output the respective pixel of the camera frame buffer

630 – Output the extruded mask pixel

HIGHLIGHTING 3D MODEL MESHES AND SUB-MESHES WITH POST PROCESSING

TECHNICAL FIELD

This disclosure relates generally to highlighting of three-dimensional (3D) model meshes and sub-meshes with post processing.

BACKGROUND

Augmented reality (AR) technology allows users to view items located within an AR scene. Users also can interact with the items while the items are located within the AR scene in multiple ways.

BRIEF DESCRIPTION OF THE DRAWINGS

To facilitate further description of the embodiments, the following drawings are provided in which:

FIG. 5 illustrates a flow chart for an embodiment of the activity of generating a second mask texture of the 3D model larger than the first mask texture by extruding the triangle data of FIG. 4;

Figure 1:
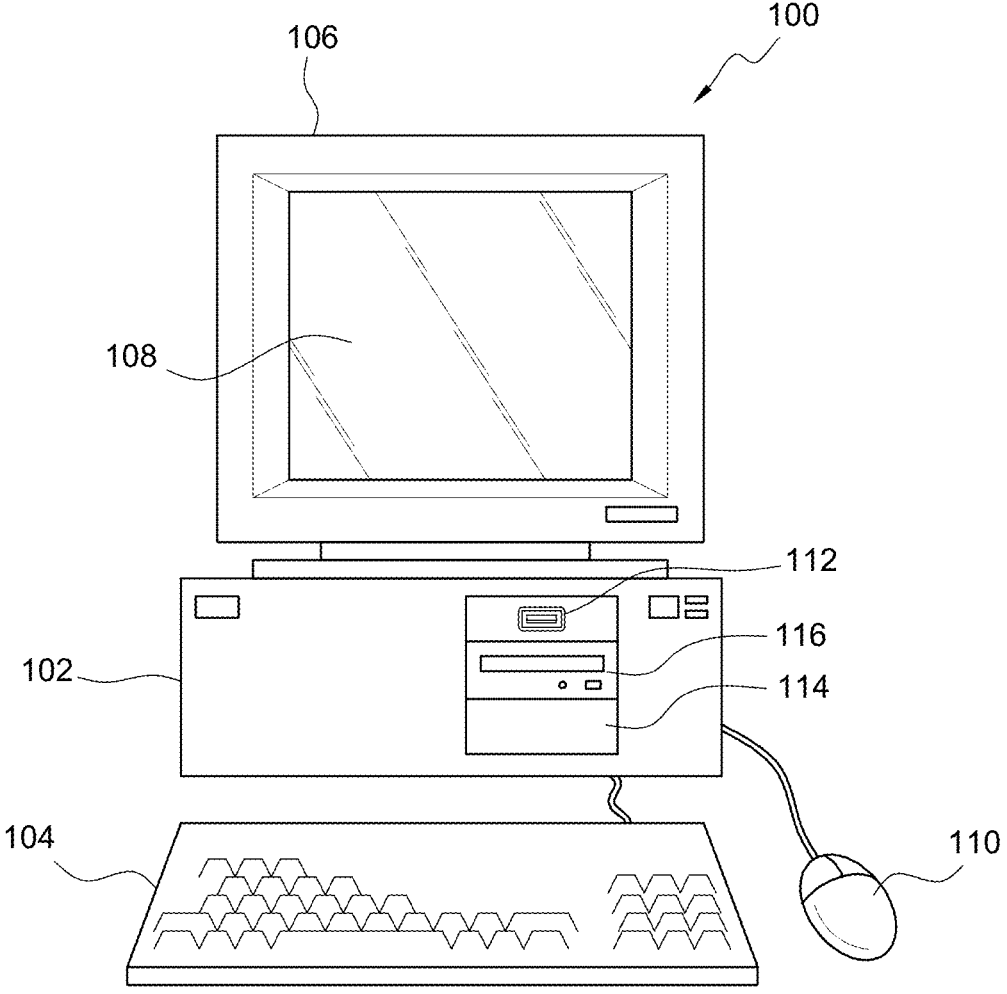
FIG. 1 illustrates a front elevational view of a computer system that is suitable for implementing an embodiment of the system disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

As defined herein, "real-time" can, in some embodiments, be defined with respect to operations carried out as soon as practically possible upon occurrence of a triggering event. In some embodiments, the term "real-time" encompasses post-processing rendering using a pipeline running in real-time per frame. A triggering event can include receipt of data necessary to execute a task or to otherwise process information. Because of delays inherent in transmission and/or in computing speeds, the term "real-time" further encompasses operations that occur in "near" real-time or somewhat delayed from a triggering event. In a number of embodiments, "real-time" can mean real-time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than 1 second, 10 seconds, 1 minute, or another suitable time delay period.

DESCRIPTION OF EXAMPLES OF EMBODIMENTS

Figure 2:
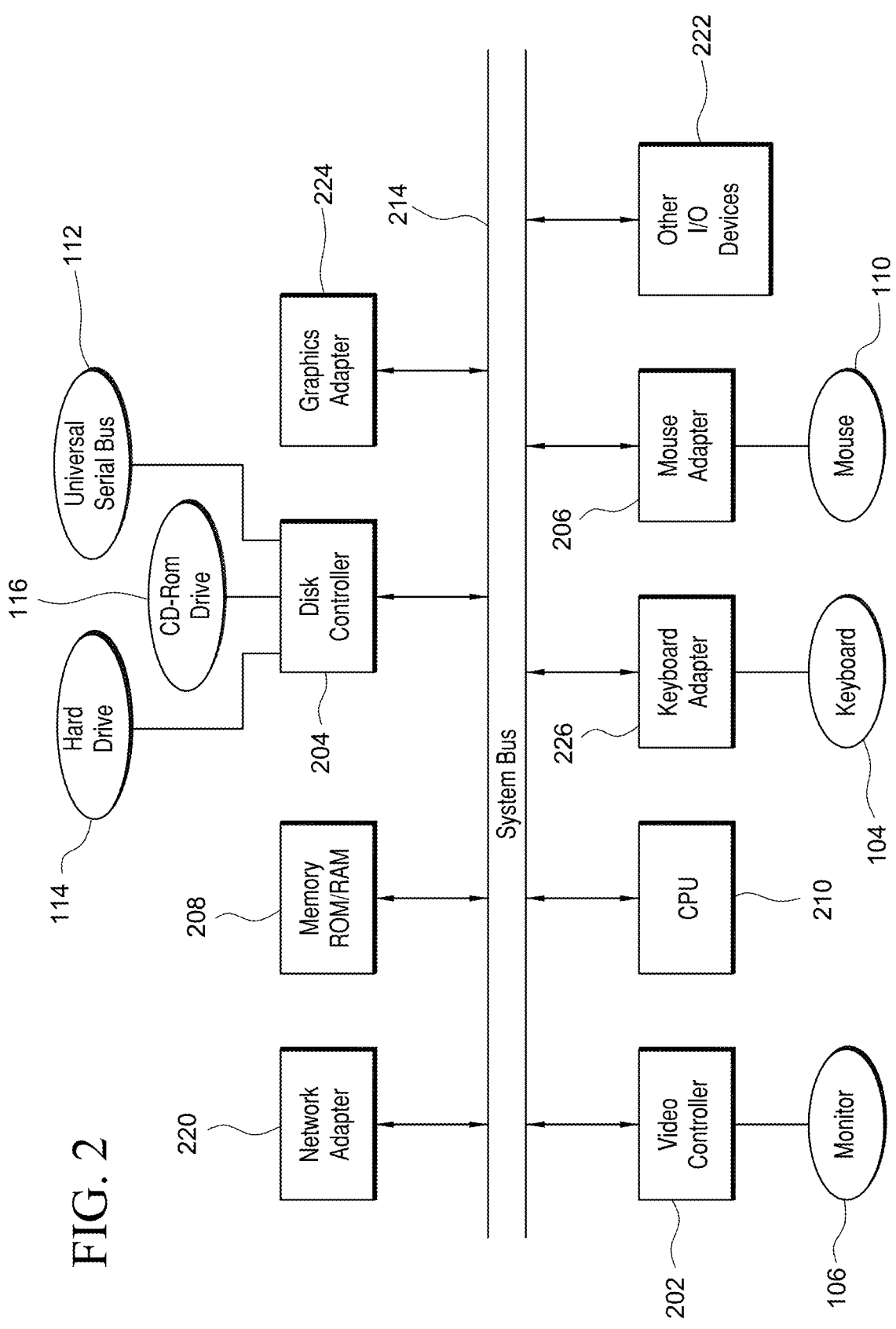
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the non-transitory computer readable media described herein. As an example, a different or separate one of computer system 100 (and its internal components, or one or more elements of computer system 100) can be suitable for implementing part or all of the techniques described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to memory storage unit 208 that includes both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can include microcode such as a Basic Input-Output System (BIOS). In some examples, the one or more memory storage units of the various embodiments disclosed herein can include memory storage unit 208, a USB-equipped electronic device (e.g., an external memory storage unit (not shown) coupled to universal serial bus (USB) port 112 (FIGS. 1-2)), hard drive 114 (FIGS. 1-2), and/or CD-ROM, DVD, Blu-Ray, or other suitable media, such as media configured to be used in CD-ROM and/or DVD drive 116 (FIGS. 1-2). Non-volatile or non-transitory memory storage unit(s) refer to the portions of the memory storage units(s) that are non-volatile memory and not a transitory signal. In the same or different examples, the one or more memory storage units of the various embodiments disclosed herein can include an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Exemplary operating systems can include one or more of the following: (i) Microsoft® Windows® operating system (OS) by Microsoft Corp. of Redmond, Washington, United States of America, (ii) Mac® OS X by Apple Inc. of Cupertino, California, United States of America, (iii) UNIX® OS, and (iv) Linux® OS. Further exemplary operating systems can comprise one of the following: (i) the iOS® operating system by Apple Inc. of Cupertino, California, United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, California, United States of America, (v) the Windows Mobile™ operating system by Microsoft Corp. of Redmond, Washington, United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to a keyboard 104 (FIGS. 1-2) and a mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing a monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM and/or DVD drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 (FIG. 1) by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 (FIG. 1) and the circuit boards inside chassis 102 (FIG. 1) are not discussed herein.

When computer system 100 in FIG. 1 is running, program instructions stored on a USB drive in USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out all or at least part of the techniques described herein. In various embodiments, computer system 100 can be reprogrammed with one or more modules, system, applications, and/or databases, such as those described herein, to convert a general purpose computer to a special purpose computer. For purposes of illustration, programs and other executable program components are shown herein as discrete systems, although it is understood that such programs and components may reside at various times in different storage components of computer system 100, and can be executed by CPU 210. Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smartphone. In certain additional embodiments, computer system 100 may comprise an embedded system.

Figure 3:
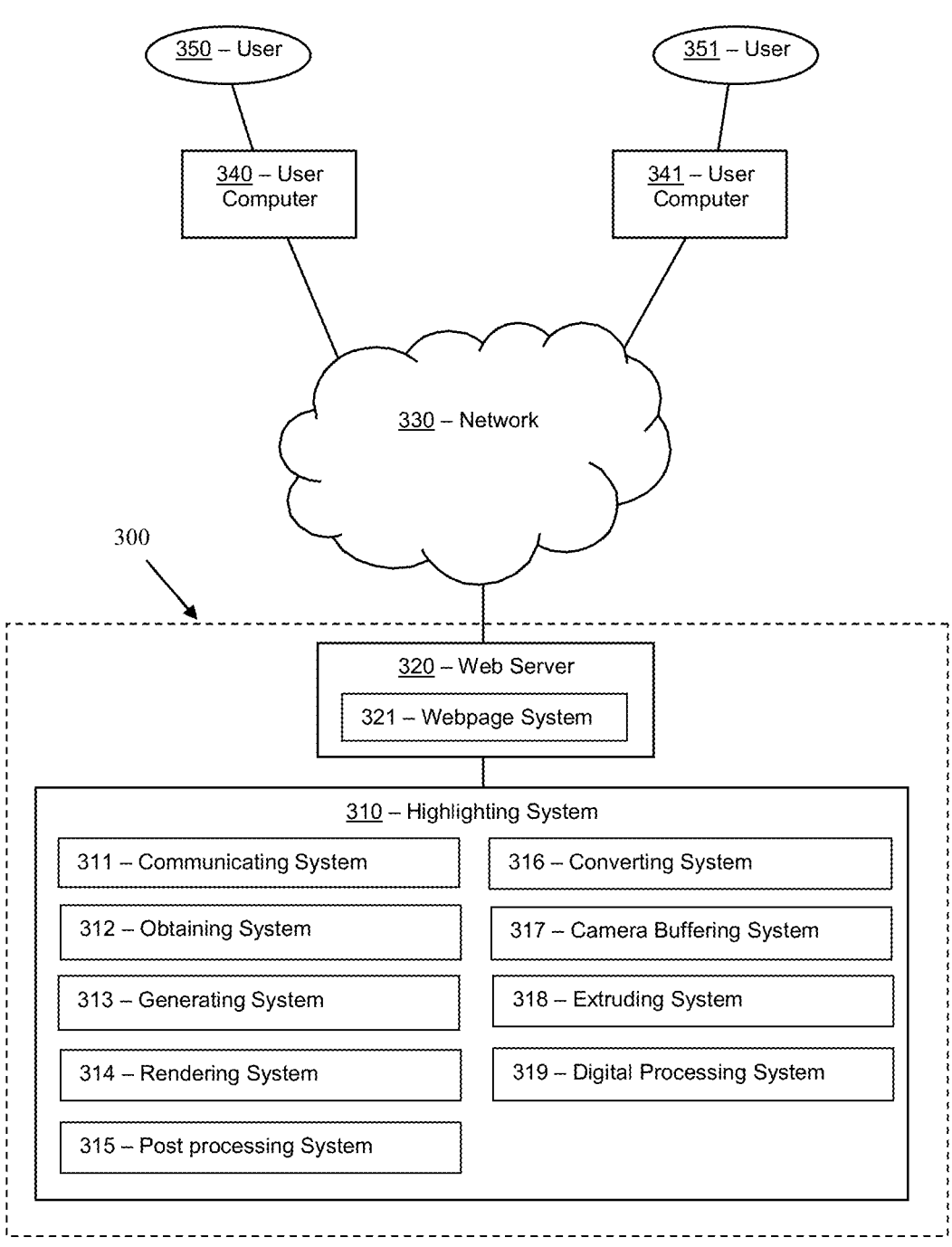
FIG. 3 illustrates a block diagram of a system of automatically rendering an outline mesh of a 3D model, according to an embodiment.

Turning ahead in the drawings, FIG. 3 illustrates a block diagram of a system 300 of automatically rendering an outline mesh of a 3D model, according to an embodiment. System 300 is merely exemplary and embodiments of the system are not limited to the embodiments presented herein. The system can be employed in many different embodiments or examples not specifically depicted or described herein. In some embodiments, certain elements, modules, or systems of system 300 can perform various procedures, processes, and/or activities. In other embodiments, the procedures, processes, and/or activities can be performed by other suitable elements, modules, or systems of system 300. System 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

In many embodiments, system 300 can include a highlighting system 310 and/or a web server 320. Highlighting system 310 and/or web server 320 can each be a computer system, such as computer system 100 (FIG. 1), as described above, and can each be a single computer, a single server, or a cluster or collection of computers or servers, or a cloud of computers or servers. In another embodiment, a single computer system can host two or more of, or all of, highlighting system 310 and/or web server 320. Additional details regarding highlighting system 310 and/or web server 320 are described herein.

In a number of embodiments, each of highlighting system 310 and/or web server 320 can be a special-purpose computer programed specifically to perform specific functions not associated with a general-purpose computer, as described in greater detail below.

In some embodiments, web server 320 can be in data communication through a network 330 with one or more user computers, such as user computers 340 and/or 341. Network 330 can be a public network, a private network or a hybrid network. In some embodiments, user computers 340-341 can be used by users, such as users 350 and 351, which also can be referred to as customers, in which case, user computers 340 and 341 can be referred to as customer computers. In many embodiments, web server 320 can host one or more sites (e.g., websites) that allow users to download 3D images into interactive virtual environments (e.g., augmented reality scenes), browse and/or search for items (e.g., products), to add items to an electronic shopping cart, and/or to order (e.g., purchase) items, in addition to other suitable activities.

In some embodiments, an internal network that is not open to the public can be used for communications between highlighting system 310 and/or web server 320 within system 300. Accordingly, in some embodiments, highlighting system 310 (and/or the software used by such systems) can refer to a back end of system 300, which can be operated by an operator and/or administrator of system 300, and web server 320 (and/or the software used by such system) can refer to a front end of system 300, and can be accessed and/or used by one or more users, such as users 350-351, using user computers 340-341, respectively. In these or other embodiments, the operator and/or administrator of system 300 can manage system 300, the processor(s) of system 300, and/or the memory storage unit(s) of system 300 using the input device(s) and/or display device(s) of system 300.

In certain embodiments, user computers 340-341 can be desktop computers, laptop computers, a mobile device, and/or other endpoint devices used by one or more users 350 and 351, respectively. A mobile device can refer to a portable electronic device (e.g., an electronic device easily conveyable by hand by a person of average size) with the capability to present audio and/or visual data (e.g., text, images, videos, music, etc.). For example, a mobile device can include at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can include a volume and/or weight sufficiently small as to permit the mobile device to be easily conveyable by hand. For examples, in some embodiments, a mobile device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile device can weigh less than or equal to 15.6 Newtons, 17.8 Newtons, 22.3 Newtons, 31.2 Newtons, and/or 44.5 Newtons.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can include a mobile device, and vice versa. However, a wearable user computer device does not necessarily include a mobile device, and vice versa.

In specific examples, a wearable user computer device can include a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can include (i) Google Glass™ product or a similar product by Google Inc. of Menlo Park, California, United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, New York, United States of America. In other specific examples, a head mountable wearable user computer device can include the Virtual Retinal Display™ product, or similar product by the University of Washington of Seattle, Washington, United States of America. Meanwhile, in further specific examples, a limb mountable wearable user computer device can include the iWatch™ product, or similar product by Apple Inc. of Cupertino, California, United States of America, the Galaxy Gear or similar product of Samsung Group of Samsung Town, Seoul, South Korea, the Moto 360 product or similar product of Motorola of Schaumburg, Illinois, United States of America, and/or the Zip™ product, One™ product, Flex™ product, Charge™ product, Surge™ product, or similar product by Fitbit Inc. of San Francisco, California, United States of America.

In several embodiments, system 300 can include one or more input devices (e.g., one or more keyboards, one or more keypads, one or more pointing devices such as a computer mouse or computer mice, one or more touchscreen displays, a microphone, etc.), and/or can each include one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to system 300 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processor(s) and/or the memory storage unit(s). In some embodiments, the KVM switch also can be part of system 300. In a similar manner, the processors and/or the non-transitory computer-readable media can be local and/or remote to each other.

Meanwhile, in many embodiments, system 300 also can be configured to communicate with and/or include one or more databases. The one or more databases can include a product database that contains information about products, items, or SKUs (stock keeping units), for example, among other data as described herein, such as described herein in further detail. The one or more databases can be stored on one or more memory storage units (e.g., non-transitory computer readable media), which can be similar or identical to the one or more memory storage units (e.g., non-transitory computer readable media) described above with respect to computer system 100 (FIG. 1). Also, in some embodiments, for any particular database of the one or more databases, that particular database can be stored on a single memory storage unit or the contents of that particular database can be spread across multiple ones of the memory storage units storing the one or more databases, depending on the size of the particular database and/or the storage capacity of the memory storage units.

The one or more databases can each include a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between system 300, network 330, and/or the one or more databases can be implemented using any suitable manner of wired and/or wireless communication. Accordingly, system 300 can include any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can include Bluetooth, Zigbee, Wireless Universal Serial Bus (USB), Z-Wave, etc.; exemplary LAN and/or WAN protocol(s) can include Institute of Electrical and Electronic Engineers (IEEE) 802.3 (also known as Ethernet), IEEE 802.11 (also known as WiFi), etc.; and exemplary wireless cellular network protocol(s) can include Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can include wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can include wireless communication hardware including, for example, one or more radio transceivers, one or more infrared transceivers, etc. Additional exemplary communication hardware can include one or more networking components (e.g., modulator-demodulator components, gateway components, etc.).

In many embodiments, highlighting system 310 can include a communicating system 311, an obtaining system 312, a generating system 313, a rendering system 314, a post processing system 315 a converting system 316, a camera buffering system 317, an extruding system 318, and/or a digital processing system 319. In many embodiments, the systems of highlighting system 310 can be modules of computing instructions (e.g., software modules) stored at non-transitory computer readable media that operate on one or more processors. In other embodiments, the systems of highlighting system 310 can be implemented in hardware. Highlighting system 310 can be a computer system, such as computer system 100 (FIG. 1), as described above, and can be a single computer, a single server, or a cluster or collection of computers or servers, or a cloud of computers or servers. In another embodiment, a single computer system can host highlighting system 310. Additional details regarding highlighting system 310 and the components thereof are described herein.

Figure 4:
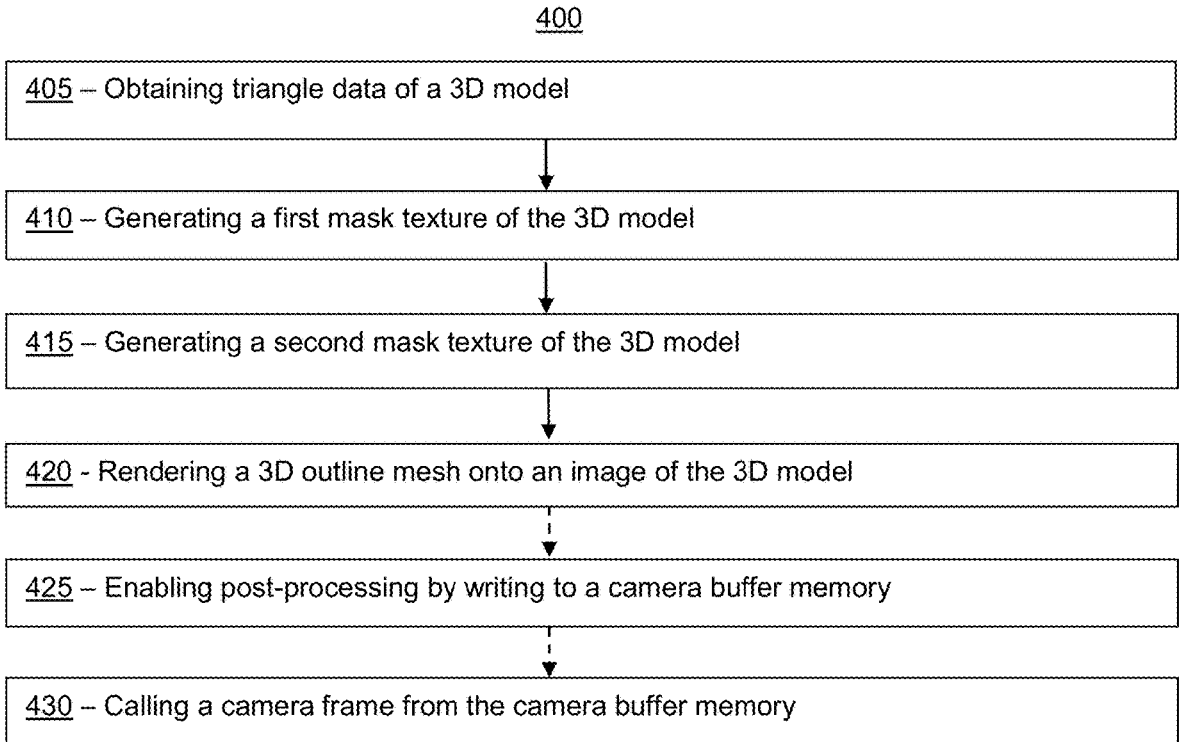
FIG. 4 illustrates a flow chart for a method, according to another embodiment.

Turning ahead in the drawings, FIG. 4 illustrates a flow chart for a method 400, according to another embodiment. In some embodiments, method 400 can be a method of automatically rendering an outline of a 3D model in a virtual environment, according to an embodiment. In many embodiments, method 400 also can render an outline of a portion of the 3D model in the virtual environment, according to an embodiment. Method 400 is merely exemplary and is not limited to the embodiments presented herein. Method 400 can be employed in many different embodiments and/or examples not specifically depicted or described herein. In some embodiments, the procedures, the processes, and/or the activities of method 400 can be performed in the order presented. In other embodiments, the procedures, the processes, and/or the activities of method 400 can be performed in any suitable order. In still other embodiments, one or more of the procedures, the processes, and/or the activities of method 400 can be combined or skipped. In several embodiments, system 300 (FIG. 3) can be suitable to perform method 400 and/or one or more of the activities of method 400.

In these or other embodiments, one or more of the activities of method 400 can be implemented as one or more computing instructions configured to run at one or more processors and configured to be stored at one or more non-transitory computer-readable media. Such non-transitory computer-readable media can be part of a computer system such as highlighting system 310 and/or web server 320. The processor(s) can be similar or identical to the processor(s) described above with respect to computer system 100 (FIG. 1).

Referring to FIG. 4, method 400 can include an activity 405 of obtaining triangle data of a 3D model of an item. In various embodiments, activity 405 can begin with converting the original image of the 3D model into a simulated graphic image made up of triangle vertices and indices of the original image. In several embodiments, the simulated graphic image of the original image can be converted into triangles and/or triangulation patterns of the item generated and/or modified by processors in a computer. In some embodiments, generating a set of points of the original image or a set of pixels covering the original image can be used to create the multiple triangles or triangulation patterns of the item on the simulated graphic imaged.

In several embodiments, activity 405 also can include parsing and collecting the triangle data of the 3D model of the item. In various embodiments, automatically parsing and collecting triangle data can be initiated or triggered when the 3D model of the item is loaded into an augmented reality (AR) environment. In some embodiments, collecting the triangle data can include triangle indices and vertex data. In many embodiments, each face of a triangle can include 3 vertices to form a respective triangle.

Figure 7:
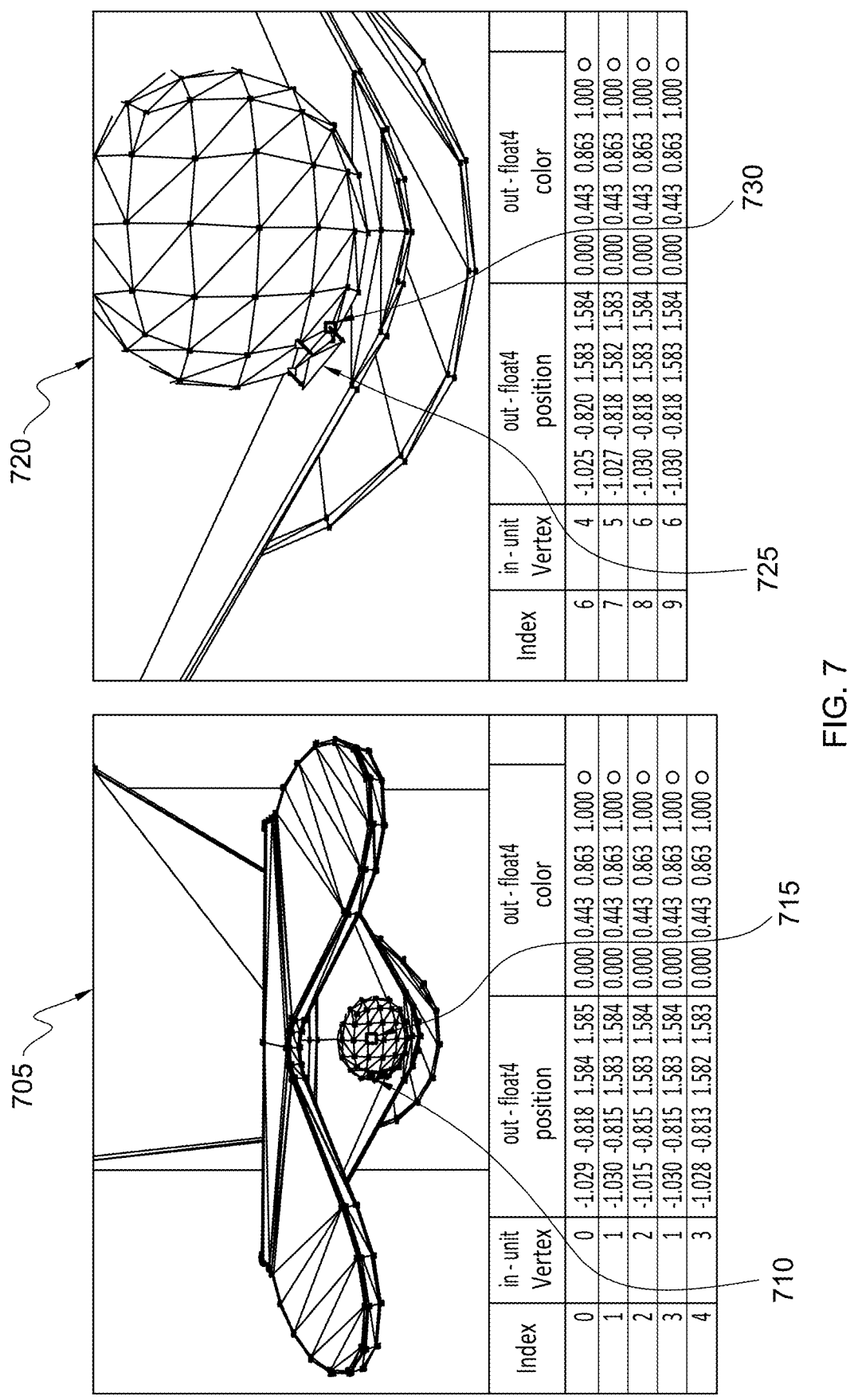
FIG. 7 illustrates a simulated graphic image of a front view of an item and a close-up thereof.

In some embodiments, the triangle indices are labels for the vertices that when connected can be configured to form a surface area as used in an AR environment, a virtual environment, and/or another suitable interactive digital media. FIG. 7 illustrates a simulated graphic image of a front view of an item and a close-up thereof. In the examples shown in FIG. 7, image 705 is a simulated graphic image of a frontal view of an item. As shown in the example, the triangle vertices and indices can be generated to spatially calibrate and cover each portion of each surface area and each dimensional angle depicting the original item in the simulated graphic image. As shown in image 705, image 705 includes a triangle cluster 710 located on a clip space and an extrusion point 715 of the original image. Extrusion point 715 illustrates how a position of each vertex can be passed in the clip space without modifying it to output a true mask texture. FIG. 7 illustrates a close up view of image 705 in image 720 to illustrate how a triangle of triangle cluster 710 is extruded to create a larger space within the clip space. Image 720 also illustrates a close-up view of an extrusion point 730. Image 725 illustrates how to implement the extrusion of each vertex of a triangle of the mesh to output a second larger mask texture. As shown in this example of the clip space in image 725, an area of points are extruded to become larger than the original clip space after the area is transformed.

In various embodiments, method 400 further can include an activity 410 of generating a first mask texture of the 3D model based on the triangle data. In several embodiments, generating the first mask texture can include rendering the collective number of triangle and vertex data into a custom texture (e.g., buffer) to build a mask texture or mask. In some embodiments, the mask texture is created to be used as a representation of a shape of the 3D model to be viewed and/or inserted into a virtual scene or environment which can be differentiated by the image of the 3D model which is a representation of the item. In several embodiments, generating the first mask texture of the 3D model can cover an image of an item and/or portions of the image of the item.

In various embodiments, activity 410 of generating the first mask texture of the 3D model can include rendering the 3D model with a color by passing a position of each vertex in a clip space unmodified to create a true mask texture of the 3D model. In several embodiments, the color can include a suitable color that highlights the 3D model contrasted with the color in the AR environment, such as a blue color contrasted with an AR environment with natural lighting.

In a number of embodiments, method 400 also can include an activity 415 of generating a second mask texture of the 3D model larger than the first mask texture by extruding the triangle data. In various embodiments, generating the second mask texture can include re-rendering the collective or combined triangle data and vertex data onto another custom texture with each vertex extruded along the normal (e.g., perpendicular to each triangle) by a small distance leading to a slightly larger mask texture than the first mask texture. In several embodiments, generating the second mask texture of the 3D model can cover an image of an item and/or portions of the image of the item. In several embodiments, activity 415 of generating a second mask texture can be similar or identical to the activities described above in connection with 720 (FIG. 7).

In some embodiments, the first mask texture and the second mask texture rendered using a rendering pipeline on a graphical processing unit (GPU). In various embodiments, creating a rendering pipeline can include running post-processing of camera pixel data in real-time on a GPU.

In several embodiments, the rendering pipeline receives as input data (i) the triangle data comprising respective vertex positions and a respective normal vector for each triangle of the 3D model, (ii) a camera view matrix, and (iii) a camera projection matrix.

Turning ahead in the drawings, FIG. 5 illustrates a flow chart for activity 415 of generating a second mask texture of the 3D model larger than the first mask texture by extruding the triangle data, according to an embodiment. Activity 415 can be employed in many different embodiments and/or examples not specifically depicted or described herein. In some embodiments, the procedures, the processes, and/or the activities of activity 415 can be performed in the order presented or in parallel. In other embodiments, the procedures, the processes, and/or the activities of activity 415 can be performed in any suitable order. In still other embodiments, one or more of the procedures, the processes, and/or the activities of activity 415 can be combined or skipped.

In many embodiments, activity 415 can include an activity 510 of converting each of the respective vertex positions of the triangle data into the clip space. In several embodiments, activity 510 of converting each of the respective vertex positions of the triangle data into the clip space can be similar or identical to the activities described above in connection with triangle cluster 710 and image 725 (FIG. 7).

In some embodiments, activity 415 also can include an activity 515 of adding an offset of a position of the vertex along the respective normal vector of each of the triangle data by a predetermined offset. In various embodiments, the predetermined offset is 0.01.

Returning to the drawings in FIG. 4, method 400 can also include an activity 420 of rendering a 3D outline mesh onto an image of the 3D model to highlight the 3D model, such that the 3D outline mesh subtracts the first mask texture for the second mask texture. In several embodiments, activity 420 also can include rendering a 3D outline mesh onto an image of the 3D model to highlight the 3D model in an augmented reality view of a camera scene. In some embodiments, activity 420 of rendering the 3D outline mesh can include rendering multiple 3D outline meshes and/or 3D outline sub-meshes for multiple 3D models. In various embodiments, activity 420 of rendering the 3D outline mesh can include rendering multiple 3D outline meshes and/or 3D outline sub-meshes for multiple 3D models that can be added into a same AR environment. An advantage of adding the 3D outline mesh or 3D outline sub-mesh to each 3D model or portions of each 3D model in the same AR environment is to show the user which 3D model is being selected and isolated for 360 degree viewing.

In several embodiments, the 3D outline mesh can include adding a solid outline around the 3D model to highlight the item in an augmented reality 3D framework (e.g., RealityKit). In various embodiments, adding the solid outline can include implementing a custom multi-pass post-processing rendering pipeline (rendering pipeline) running in real time per frame. In some embodiments, automatically enabling or initiating post-processing of the image can begin by the placement or download of the 3D model into the augmented reality (AR) scene (e.g., environment). In several embodiments, post-processing can include using the rendering pipeline that writes to the output camera pixel buffer (e.g., camera memory) before loading the AR scene into the camera view. In various embodiments, an advantage of writing to a camera pixel buffer, that has another advantage of being able to temporarily store images in memory, can allow more time to process each of the images stored before the data of the images are written into the memory card that is stored in the camera hardware. In some embodiments, with post-processing enabled, every single camera frame can be called back to be processed before each frame is presented to the user based on a camera speed of a predetermined resolution rate, such as 60 frames per second.

In various embodiments, the first mask texture and the second mask texture can be rendered using a rendering pipeline on a graphical processing unit (GPU). In several embodiments, running the rendering pipeline per frame can construct two mask textures of the 3D model on the GPU. In several embodiments, generating two mask textures of the 3D model can cover an image of an item and/or portions of the image of the item.

In some embodiments, the rendering pipeline can receive as input data (i) the triangle data comprising respective vertex positions and a respective normal vector for each triangle of the 3D model, (ii) a camera view matrix, and (iii) a camera projection matrix.

Figure 6:
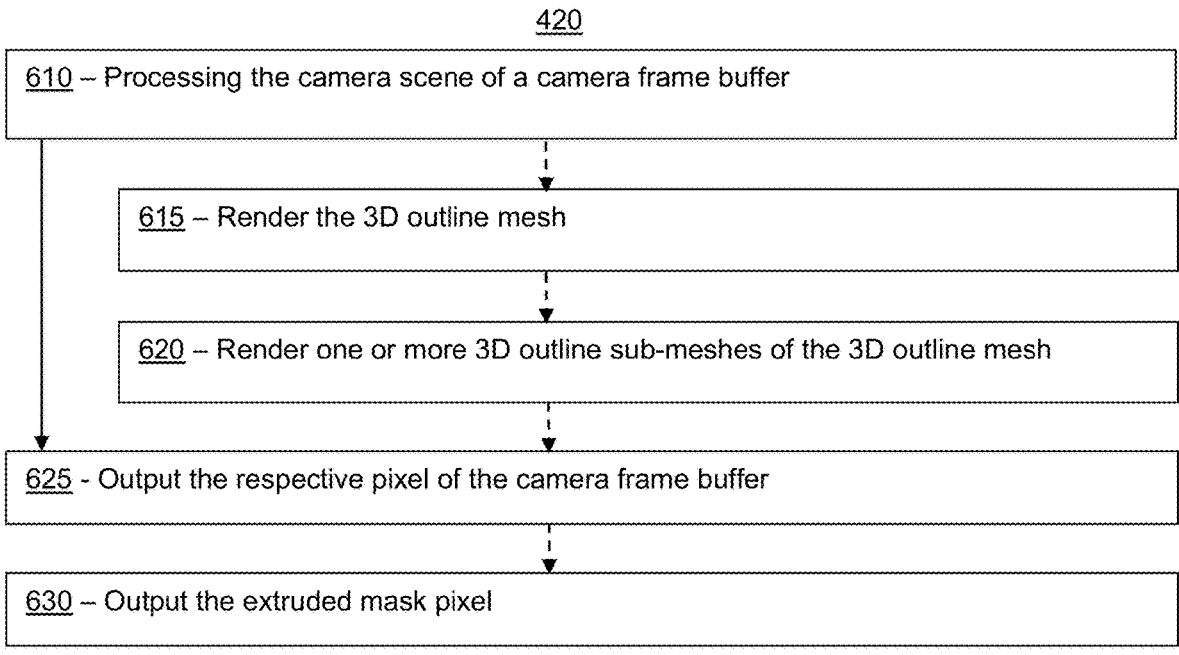
FIG. 6 illustrates a flow chart for an embodiment of the activity of rendering the 3D outline mesh of FIG. 4.

Turning ahead in the drawings, FIG. 6 illustrates a flow chart for activity 420 of rendering the 3D outline mesh, according to an embodiment. Activity 420 can be employed in many different embodiments, and/or examples not specifically depicted or described herein. In many embodiments, the procedures, the processes, and/or the activities of activity 420 can be performed in the order presented or in parallel. In other embodiments, the procedures, the processes, and/or the activities of activity 420 can be performed in any suitable order. In still other embodiments, one or more of the procedures, the processes, and/or the activities of activity 420 can be combined or skipped.

In a number of embodiments, activity 420 can include an activity 610 of processing, using a combine kernel function, the camera scene of a camera frame buffer from a camera buffer memory prior to rendering the 3D outline mesh.

Figure 8:
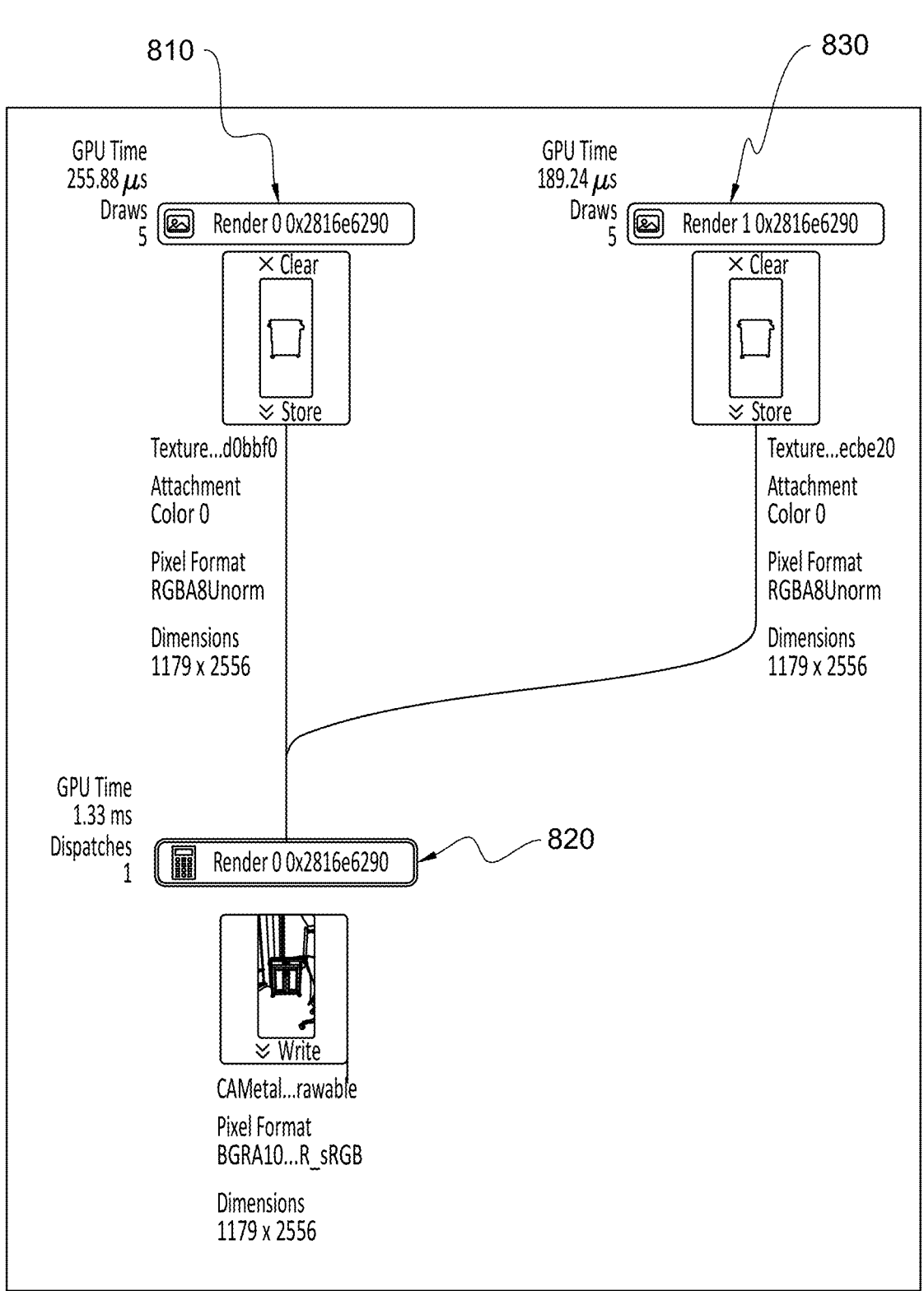
FIG. 8 illustrates an example of an overall process of rendering a 3D outline mesh based on processing the images on the GPU.

In various embodiments, activity 610 can include an activity 615 of rendering the 3D outline mesh. In some embodiments, rendering the 3D outline mesh can include running the combine kernel function to subtract the first mask texture from the second mask texture before writing the camera image (e.g., buffer) into the 3D outline mesh. In several embodiments, rendering the 3D outline mesh and/or 3D outline sub-mesh can cover an image of an item and/or portions of the image of the item. FIG. 8 illustrates an example of an overall process of rendering a 3D outline mesh based on processing the images on the GPU. In the example shown in FIG. 8, activity 810 is an output mask texture as rendered by the GPU of a first mask texture and activity 830 is another output mask texture as rendered by the GPU of a second mask texture larger than the first mask texture shown in activity 810. As shown in FIG. 8, activity 820 is another the output of running the combine kernel function to subtract the first mask texture from the second mask texture after writing the camera image into the 3D outline mesh. In various embodiments, the processes and procedures implemented in activity 615 of rendering the 3D outline mesh can be used to render a 3D outline sub-mesh of an item.

Figure 10:
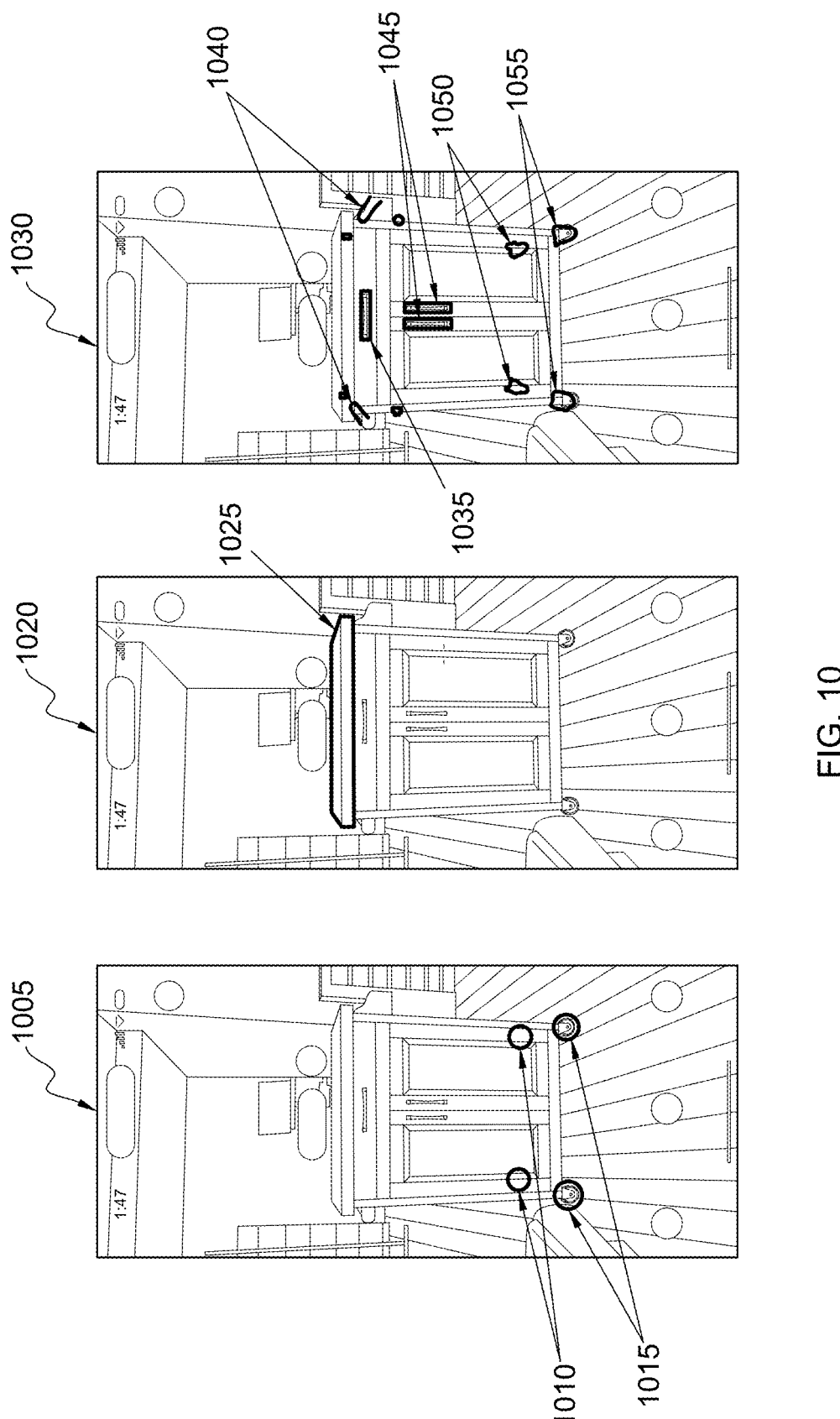
FIG. 10 illustrates example images of displaying one or more 3D outline sub-meshes in the AR scene where each sub-mesh can isolate and/or highlight a respective portion and/or multiple portions of the 3D model.

In several embodiments, activity 610 also or alternatively can include an activity 620 of rendering one or more 3D outline sub-meshes of the 3D outline mesh and/or a combination of multiple meshes. In some embodiments, activity 620 can also include rendering one or more 3D outline sub-meshes of the 3D model loaded into the AR scene. In various embodiments, rendering the 3D outline sub-meshes can include all of the processes and techniques utilized in rendering the 3D outline mesh. FIG. 10 illustrates example images of displaying one or more 3D outline sub-meshes in the AR scene, where each sub-mesh can isolate and/or highlight a respective portion and/or multiple portions of the 3D model. In the example shown in FIG. 10, images 1005, 1020, and 1030 each show a 3D model of an exemplary piece of cabinet furniture in an AR scene where various 3D outline sub-meshes are highlighted in each of the images. As shown in the example, image 1005 is highlighted with two 3D sub-meshes for the user to interact and/or view the details of 3D sub-meshes in a 360 degree view space. For example, sub-mesh highlight 1010 shows two 3D sub-meshes highlighting a portion of both doors on the item and sub-mesh highlight 1015 shows another two 3D sub-meshes highlight another portion of the wheels on the cabinet furniture. Similarly, 3D sub-meshes in sub-mesh highlight 1025 highlights the top of the cabinet furniture in image 1020. As another example, multiple sub-meshes can be highlighted on multiple areas on the 3D model in image 1030. As shown in the example in image 1030, multiple sub-meshes highlight the 3D model can be shown as sub-mesh highlight 1035 (a front drawer pull), sub-mesh highlight 1040 (two side handle sub-meshes), sub-mesh highlight 1045 (two front cabinet door handles), sub-mesh highlight 1050 (two hinges on the cabinet doors) and sub-mesh highlight 1055 (two front wheels of the cabinet).

In some embodiments, for each respective pixel of the camera frame buffer, activity 420 can include an activity 625 of outputting the respective pixel of the camera frame buffer when a mask texture pixel of the first mask texture and an extruded mask pixel of the second mask texture are identical.

In a number of embodiments, for each respective pixel of the camera frame buffer, activity 420 can include an activity 630 of outputting the extruded mask pixel when the mask texture pixel and extruded mask pixel are not identical.

Returning to the drawings in FIG. 4, method 400 also can include an activity 425 of enabling post-processing by writing to a camera buffer memory of an electronic device after the 3D model is placed into the camera scene.

In various embodiments, method 400 further can include an activity 430 of calling a camera frame from the camera buffer memory. In some embodiments, activity 430 also can include modifying the camera frame by encoding the camera frame, as modified, onto a final output texture to be digitally rendered on a display screen, such as an AR scene and/or a virtual environment.

Figure 9:
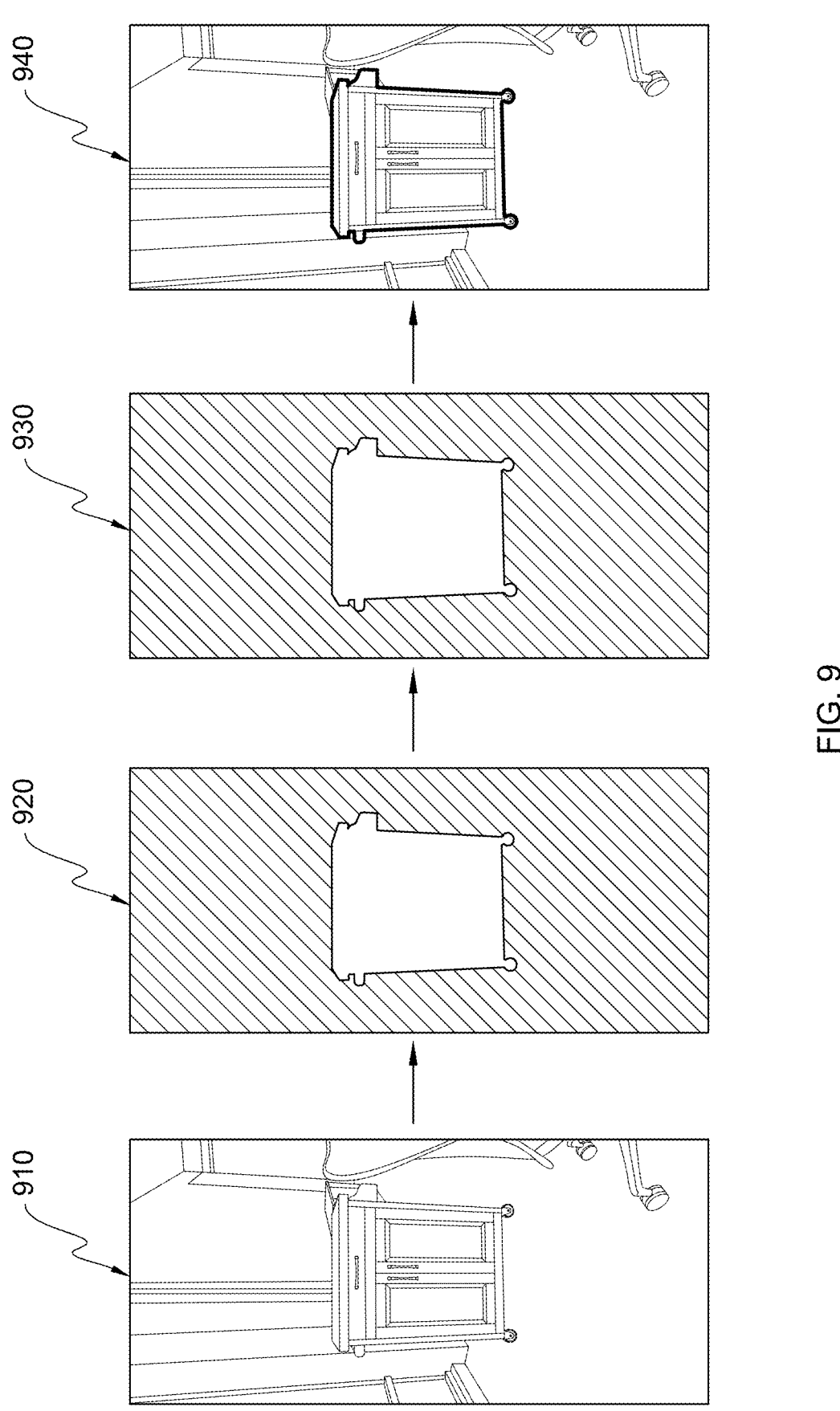
FIG. 9 illustrates images rendered in a process of generating a 3D outline mesh and/or submesh.

Turning to the drawings, FIG. 9 illustrates images rendered in a process of generating a 3D outline mesh and/or a submesh. In various embodiments, FIG. 9 can beginning with loading an image 910 into an AR scene. In several embodiments, the rendering pipeline can output an image 920 of a first mask texture as a direct render of the 3D model with a custom solid color, such as blue. In various embodiments, the direct render can include passing the position of each vertex in clip space without modifying each vertex to output a true mask of the original 3D model that can be expressed as: position=modelviewprojection matrix*vertex position. In some embodiments, the rendering pipeline can output an image 930 of a second mask texture slightly extruded as a larger render of the 3D model also with a custom solid color, such as blue. In several embodiments, generating the second mask texture can include an offset process by using vertex extrusion by converting each vertex data of a respective triangle into a clip space then adding the position of the vertex with the normalized normal vector of the triangle multiplied by a constant factor. As an example of the offset parameters for the second mask texture can include:

(i) the outline/WidthinClipSpace=0.01.
  (ii) a normal Vector=normalize(vertexNormal)*outlineWidthinClipSpace.
  (iii) position=modelViewProjectionMatrix*(vertexPosition+normal Vector).

In some embodiments, the rendering pipeline can output an image 940 of the 3D outline mesh as layered over the 3D model within the AR scene. In several embodiments, generating the 3D outline mesh can include running a compute kernel function to process the camera frame buffer and the two masks on the GPU before rendering image 940 on a screen within the AR scene. In various embodiments, a compute kernel function can be run for each pixel available on the camera frame buffer (e.g., 1k*2k times for a total of ~2 million executions for a high resolution device. In some embodiments, inputs for the compute kernel function can include i) a camera frame buffer (e.g., texture), ii) a mask texture of the 3D model and iii) an extruded mask texture of the 3D model. In various embodiments, outputs from the compute kernel function can include i) combined texture of the resulting image to present to the user. In several embodiments, for each pixel coordinate a) if the mask texture's pixel and the extruded mask texture's pixel are the same, the compute kernel function outputs the camera buffer's pixel value and b) if the mask texture's pixel and extruded mask texture's pixel are not the same, the computer kernel function can output the extruded mask texture's pixel value due to coordinate being the extruded part of the texture.

Returning to the drawings in FIG. 3, communicating system 311 can at least partially perform activity 405 also can include parsing and collecting the triangle data of the 3D model of the item.

In many embodiments, obtaining system 312 can at least partially perform activity 405 of obtaining triangle data of a 3D model of an item, In some embodiments, generating system 313 can at least partially perform activity 410 of generating a first mask texture of the 3D model based on the triangle data, activity 415 of generating a second mask texture of the 3D model larger than the first mask texture by extruding the triangle data, In several embodiments, rendering system 314 can at least partially perform activity 420 of rendering a 3D outline mesh onto an image of the 3D model to highlight the 3D model, such that the 3D outline mesh subtracts the first mask texture for the second mask texture, activity 615 of rendering the 3D outline mesh, activity 620 of rendering one or more 3D outline sub-meshes of the 3D outline mesh and/or a combination of multiple meshes.

In a number of embodiments, post processing system 315 can at least partially perform activity 425 of enabling post-processing by writing to a camera buffer memory of an electronic device after the 3D model is placed into the camera scene, In various embodiments, converting system 316 can at least partially perform activity 510 of converting each of the respective vertex positions of the triangle data into the clip space, In some embodiments, camera buffering system 317 can at least partially perform activity 430 of calling a camera frame from the camera buffer memory, In several embodiments, extruding system 318 can at least partially perform activity 515 of adding an offset of a position of the vertex along the respective normal vector of each of the triangle data by a predetermined offset, activity 625 of outputting the respective pixel of the camera frame buffer when a mask texture pixel of the first mask texture and an extruded mask pixel of the second mask texture are identical, activity 630 of outputting the extruded mask pixel when the mask texture pixel and extruded mask pixel are not identical, In many embodiments, digital processing system 319 can at least partially perform an activity 610 of processing, using a combine kernel function, the camera scene of a camera frame buffer from a camera buffer memory prior to rendering the 3D outline mesh, In several embodiments, web server 320 can include a webpage system 321. Webpage system 321 can at least partially perform sending instructions to user computers (e.g., 350-351 (FIG. 3)) based on information received from communicating system 311.

In many embodiments, the techniques described herein can be used continuously at a scale that cannot be handled using manual techniques. For example, the number of daily and/or monthly visits to the content source can exceed approximately ten million and/or other suitable numbers, the number of registered users to the content source can exceed approximately one million and/or other suitable numbers, and/or the number of products and/or items sold on the website can exceed approximately ten million (10,000,000) approximately each day.

In a number of embodiments, the techniques described herein can solve a technical problem that arises only within the realm of computer networks, as generating a built-in solution for outlining a 3D model with a 3D mesh of an item loaded into an AR environment. Moreover, the techniques described herein can solve a technical problem that cannot be solved outside the context of computer networks. Specifically, the techniques described herein cannot be used outside the context of computer networks, in view of a lack of data, and custom post processing with multi-pass rendering to highlight meshes, sub-meshes and/or a combination of multiple meshes that can power and/or feed an online website that is part of the techniques described herein would not exist.

Various embodiments can include a system. The system can include one or more processors and one or more non-transitory computer-readable media storing computing instructions, that when executed on the one or more processors, cause the one or more processors to perform certain acts. The acts can include obtaining triangle data of a 3D model of an item. The acts also can include generating a first mask texture of the 3D model based on the triangle data. The acts further can include generating a second mask texture of the 3D model larger than the first mask texture by extruding the triangle data. The acts additionally can include rendering a 3D outline mesh onto an image of the 3D model to highlight the 3D model. Such that the 3D outline mesh subtracts the first mask texture for the second mask texture.

A number of embodiments can include a method. The method can be implemented via execution of computing instructions configured to run on one or more processors and stored at one or more non-transitory computer-readable media. The method can include obtaining triangle data of a 3D model of an item. The method also can include generating a first mask texture of the 3D model based on the triangle data. The method additionally can include generating a second mask texture of the 3D model larger than the first mask texture by extruding the triangle data. The method further can include rendering a 3D outline mesh onto an image of the 3D model to highlight the 3D model. Such that the 3D outline mesh subtracts the first mask texture for the second mask texture.

Although automatically generating a 3D outline using a multi-pass rendering pipeline for a 3D model loaded into an AR environment has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-10 may be modified, and that the foregoing discussion of certain of these embodiments does not necessarily represent a complete description of all possible embodiments. For example, one or more of the procedures, processes, or activities of FIGS. 3-6 may include different procedures, processes, and/or activities and be performed by many different modules, in many different orders, and/or one or more of the procedures, processes, or activities of FIGS. 3-6 may include one or more of the procedures, processes, or activities of another different one of FIGS. 3-6. Additional details regarding communicating system 311, obtaining system 312, generating system 313, rendering system 314, post processing system 315, converting system 316, camera buffering system 317, extruding system 318, digital processing system 319, and/or webserver 320, (see FIGS. 3-6) can be interchanged or otherwise modified.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
one or more processors; and
one or more non-transitory computer-readable media storing computing instructions, that when executed on the one or more processors, cause the one or more processors to perform operations comprising:
obtaining triangle data of a three-dimensional (3D) model of an item;
generating a first mask texture of the 3D model based on the triangle data;
generating a second mask texture of the 3D model larger than the first mask texture by extruding the triangle data; and
rendering a 3D outline mesh onto an image of the 3D model to highlight the 3D model, such that the 3D outline mesh subtracts the first mask texture for the second mask texture.

2. The system of claim 1, wherein obtaining the triangle data of the 3D model comprises:
parsing and collecting the triangle data of the 3D model of the item, wherein the triangle data comprises triangle indices and vertex data.

3. The system of claim 1, wherein the computing instructions, when executed on the one or more processors, further cause the one or more processors to perform operations comprising:

enabling post-processing by writing to a camera buffer memory of an electronic device after the 3D model is placed into a camera scene; and calling a camera frame from the camera buffer memory.

4. The system of claim 1, wherein the first mask texture and the second mask texture rendered using a rendering pipeline on a graphical processing unit.

5. The system of claim 4, wherein the rendering pipeline receives as input data (i) the triangle data comprising respective vertex positions and a respective normal vector for each triangle of the 3D model, (ii) a camera view matrix, and (iii) a camera projection matrix.

6. The system of claim 5, wherein generating the first mask texture of the 3D model comprises:

rendering the 3D model with a color by passing a position of each vertex in a clip space unmodified to create a true mask texture of the 3D model.

7. The system of claim 6, wherein generating the second mask texture of the 3D model comprises:

converting each of the respective vertex positions of the triangle data into the clip space; and adding an offset of a position of the vertex along the respective normal vector of each of the triangle data by a predetermined offset.

8. The system of claim 7, wherein the predetermined offset is 0.01.

9. The system of claim 1, wherein rendering the 3D outline mesh further comprises:

adding the 3D outline mesh in an augmented reality view of a camera scene; and processing, using a combine kernel function, the camera scene of a camera frame buffer from a camera buffer memory prior to:

render the 3D outline mesh; or render one or more 3D outline sub-meshes of the 3D outline mesh.

10. The system of claim 9, wherein for each respective pixel of the camera frame buffer:

output the respective pixel of the camera frame buffer when a mask texture pixel of the first mask texture and an extruded mask pixel of the second mask texture are identical; and output the extruded mask pixel when the mask texture pixel and extruded mask pixel are not identical.

11. A method implemented via execution of computing instructions configured to run on one or more processors and stored at one or more non-transitory computer-readable media, the method comprising:

obtaining triangle data of a three-dimensional (3D) model of an item;

generating a first mask texture of the 3D model based on the triangle data;

generating a second mask texture of the 3D model larger than the first mask texture by extruding the triangle data; and rendering a 3D outline mesh onto an image of the 3D model to highlight the 3D model, such that the 3D outline mesh subtracts the first mask texture for the second mask texture.

12. The method of claim 11, wherein obtaining the of the 3D model comprises:

parsing and collecting the triangle data of the 3D model of the item, wherein the triangle data comprises triangle indices and vertex data.

13. The method of claim 11 further comprising:

enabling post-processing by writing to a camera buffer memory of an electronic device after the 3D model is placed into a camera scene; and calling a camera frame from the camera buffer memory.

14. The method of claim 11, wherein the first mask texture and the second mask texture rendered using a rendering pipeline on a graphical processing unit.

15. The method of claim 14, wherein the rendering pipeline receives as input data (i) the triangle data comprising respective vertex positions and a respective normal vector for each triangle of the 3D model, (ii) a camera view matrix, and (iii) a camera projection matrix.

16. The method of claim 15, wherein generating the first mask texture of the 3D model comprises:

rendering the 3D model with a color by passing a position of each vertex in a clip space unmodified to create a true mask texture of the 3D model.

17. The method of claim 16, wherein generating the second mask texture of the 3D model comprises:

converting each of the respective vertex positions of the triangle data into the clip space; and adding an offset of a position of the vertex along the respective normal vector of each of the triangle data by a predetermined offset.

18. The method of claim 17, wherein the predetermined offset is 0.01.

19. The method of claim 11, wherein rendering the 3D outline mesh further comprises:

adding the 3D outline mesh in an augmented reality view of a camera scene; and processing, using a combine kernel function, the camera scene of a camera frame buffer from a camera buffer memory prior to:

render the 3D outline mesh; or render one or more 3D outline sub-meshes of the 3D outline mesh.

20. The method of claim 19, wherein for each respective pixel of the camera frame buffer:

output the respective pixel of the camera frame buffer when a mask texture pixel of the first mask texture and an extruded mask pixel of the second mask texture are identical; and output the extruded mask pixel when the mask texture pixel and extruded mask pixel are not identical.

* * * * *